United States Patent
Klos et al.

(10) Patent No.: US 9,167,043 B2
(45) Date of Patent: Oct. 20, 2015

(54) SERVERS FOR DEVICE IDENTIFICATION SERVICES

(75) Inventors: Victor Bastiaan Klos, The Hague (NL); Mattijs Oskar van Deventer, Leidschendam (NL); Jeroen Laarakkers, Nootdorp (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 43 days.

(21) Appl. No.: 13/322,029

(22) PCT Filed: May 25, 2010

(86) PCT No.: PCT/NL2010/050313
§ 371 (c)(1),
(2), (4) Date: Feb. 7, 2012

(87) PCT Pub. No.: WO2010/134817
PCT Pub. Date: Nov. 25, 2010

(65) Prior Publication Data
US 2012/0131186 A1 May 24, 2012

(30) Foreign Application Priority Data

May 22, 2009 (EP) .................................... 09160930
Oct. 28, 2009 (EP) .................................... 09174329
Dec. 18, 2009 (EP) .................................... 09179966

(51) Int. Cl.
*G06F 15/173* (2006.01)
*H04L 29/08* (2006.01)
*H04W 4/02* (2009.01)

(52) U.S. Cl.
CPC ............... *H04L 67/16* (2013.01); *H04L 67/18* (2013.01); *H04L 67/30* (2013.01); *H04W 4/02* (2013.01); *H04W 4/023* (2013.01)

(58) Field of Classification Search
CPC . H04L 61/1535; H04L 67/26; H04L 67/2833; H04L 63/0492; G06F 21/566; G06F 21/57; G06F 21/6218; G06F 2221/2115; G06F 2221/2141
USPC .................................................. 709/224, 238
See application file for complete search history.

(56) References Cited

U.S. PATENT DOCUMENTS 6,887,159 B2 * 5/2005 Leen et al. ...................... 463/42
7,092,370 B2 * 8/2006 Jiang et al. ..................... 370/329

(Continued)

FOREIGN PATENT DOCUMENTS

WO      2009014438 A1      1/2009
WO   WO 2009014438 A1 *   1/2009   ............ H04M 1/725

OTHER PUBLICATIONS

International Search Report for PCT/NL2010/050313 dated Oct. 28, 2010.

*Primary Examiner* — Kevin Bates
*Assistant Examiner* — Clarence D McCray
(74) *Attorney, Agent, or Firm* — Banner & Witcoff, Ltd.

(57) ABSTRACT

A system (40) for identifying proximate devices (1,2) comprises at least one correlation server (5) for correlating data received from the devices so as to match two or more of the devices and at least one application server (6) for carrying out an application involving matched devices. The at least one correlation server (5) and the at least one application server (6) are distinct servers so as to provide a greater flexibility and scalability. The devices (1,2) may be mobile consumer devices.

18 Claims, 4 Drawing Sheets

(56) References Cited

U.S. PATENT DOCUMENTS

| | | | |
|---|---|---|---|
| 7,787,459 B2* | 8/2010 | Yuan et al. | 370/392 |
| 8,001,232 B1* | 8/2011 | Saulpaugh et al. | 709/224 |
| 8,073,447 B2* | 12/2011 | Buckley et al. | 455/437 |
| 8,078,714 B2* | 12/2011 | George et al. | 709/223 |
| 8,224,354 B2* | 7/2012 | De Vries et al. | 455/456.3 |
| 8,237,558 B2* | 8/2012 | Seyed Momen et al. | 340/539.11 |
| 8,369,266 B2* | 2/2013 | Jin et al. | 370/328 |
| 8,392,972 B2* | 3/2013 | Manring et al. | 726/5 |
| 8,522,019 B2* | 8/2013 | Michaelis | 713/168 |
| 8,644,842 B2* | 2/2014 | Arrasvuori et al. | 455/456.1 |
| 2003/0047874 A1* | 3/2003 | Leen et al. | 273/292 |
| 2005/0198265 A1* | 9/2005 | Veprek et al. | 709/224 |
| 2006/0003785 A1 | 1/2006 | Zatezalo | |
| 2007/0021127 A1* | 1/2007 | Zheng | 455/456.1 |
| 2008/0043675 A1* | 2/2008 | Mousseau et al. | 370/331 |
| 2008/0108308 A1* | 5/2008 | Ullah | 455/41.2 |
| 2008/0215675 A1* | 9/2008 | Kaminitz et al. | 709/203 |
| 2008/0263219 A1* | 10/2008 | Bacchi et al. | 709/231 |
| 2008/0288965 A1* | 11/2008 | Grechanik et al. | 719/328 |
| 2008/0301125 A1* | 12/2008 | Alves et al. | 707/5 |
| 2009/0176505 A1* | 7/2009 | Van Deventer et al. | 455/456.1 |
| 2010/0064041 A1* | 3/2010 | Tays et al. | 709/224 |
| 2010/0174708 A1* | 7/2010 | Ball et al. | 707/727 |
| 2011/0196731 A1* | 8/2011 | Christie et al. | 705/14.26 |
| 2012/0130794 A1* | 5/2012 | Strieder | 705/14.27 |
| 2012/0227105 A1* | 9/2012 | Friedrichs et al. | 726/22 |
| 2012/0260298 A1* | 10/2012 | Chen et al. | 725/114 |
| 2014/0059059 A1* | 2/2014 | Barman et al. | 707/752 |
| 2014/0165203 A1* | 6/2014 | Friedrichs et al. | 726/24 |
| 2014/0250147 A1* | 9/2014 | Shapira et al. | 707/770 |

* cited by examiner

SERVERS FOR DEVICE IDENTIFICATION SERVICES

CROSS-REFERENCE TO RELATED APPLICATIONS

This application is a U.S. National Stage application under 35 U.S.C. §371 of International Application PCT/NL2010/050313 (published as WO 2010/134817 A2), filed May 25, 2010, which claims priority to the following applications: EP 09160930.5, filed May 22, 2009; EP 09174329.4, filed Oct. 28, 2009; and EP 09179966.8, filed Dec. 18, 2009. Benefit of the filing date of each of these prior applications is hereby claimed. Each of these prior applications is hereby incorporated by reference in its entirety.

FIELD OF THE INVENTION

The present invention relates to servers for device identifications. More in particular, the present invention relates to a system for identifying proximate devices, such as proximate mobile devices, the system comprising at least one correlation server for correlating sets of identifications received from the devices, and at least one application server for carrying out an application in response to a correlated identification.

BACKGROUND

Mobile devices, such as mobile (cellular) telephones, PDAs (Personal Digital Assistants), laptop computers, and (portable) gaming consoles increasingly have multiple functions. Modern mobile telephones, for example, are not only suitable for making telephone calls but often also include a calculator, a calendar, and even games. Mobile phone games are typically designed for a single player, involving only the mobile device they are played on. However, some types of games require multiple players, each player using his/her own device. Before a multiple player game can begin, the players have to be selected and, accordingly, their mobile devices have to be identified.

It is possible to identify other mobile (or non-mobile) devices using a stored phone list containing the telephone numbers of other mobile devices and the respective names of their owners. However, the phone list contains no information regarding the availability and proximity of the other mobile devices. If a multiple player game is to be played with a group of players who are located in each other's vicinity, for example within viewing distance, the mobile devices of that group have to be identified in another way. Of course it is possible to manually enter the telephone numbers of participating mobile devices, if these numbers are known. However, this is cumbersome and prone to errors, in particular when the telephone numbers have to be read aloud.

Using Bluetooth© for identifying devices is also cumbersome. An elaborate procedure is required in which another device is selected from a so-called device discovery list and a password may be required to enable Bluetooth© pairing. This procedure is neither quick nor effortless.

Accordingly, there is a need for a simple yet effective identification mechanism for mobile devices located in each other's vicinity.

Such an identification mechanism can also be used in mobile devices other than mobile telephones, for example in PDAs, laptop computers and so-called notebook computers. An identification mechanism may not only be used in gaming applications, as PDAs and similar devices may in general need to identify other devices in order to initiate a transaction between the devices. An example of a transaction is exchanging information, such as data files, calendar appointments, and other information.

The identification mechanism would primarily be used for (mobile or non-mobile) devices which are located in each other's vicinity, as remote devices would not likely be involved in a multiple player game or data exchange. In particular, it is often desired to invite (the owner of) a device to join a game, to engage in gaming interaction, to exchange a data file, to exchange an electronic business card, to carry out a financial transaction or to exchange calendar data when (the owner of) the device is in view. For the invited device to join the game or exchange data, it first has to be identified. Accordingly, there is a need to automatically identify proximate devices and to subsequently activate a service, such as a game, involving the identified proximate devices.

International Patent Application WO2009/014438 (TNO/KPN) discloses an application server that uses a method of identifying proximate mobile devices by means of sensory identifiers. A detected sensory identifier, such as a particular sound or image, may be verified in the server. Such a verification by the server makes it unnecessary for the mobile devices to contain verification software and/or hardware, thus keeping the mobile devices relatively simple and hence inexpensive. The mutual identification resulting from this known method is typically used to initiate a game, transaction or other activity. This further activity requires suitable software running on the server. The obvious choice for the server for carrying out the further activity (game, transaction) resulting from the identification would be the server used for the identification process. However, when different servers are provided for performing several different further activities, several servers would be used, each server providing both the identification and the resulting activity. This would, however, require multiple instances of the identification process. In addition, each server would have to have the resources (memory, processing capacity) to run both the identification and the activity applications, thus making the servers relatively expensive.

SUMMARY

It is an object of the present invention to overcome these and other problems of the Prior Art and to provide a system and method for processing identifications of devices, which system and method use servers having a reduced complexity.

According to one aspect it is an object to make it possible that selected ones of a plurality of different servers may set up different applications involving selected pairs of devices according to sensory information received at the devices.

According to one aspect it is an object to make it possible that the task of identifying paired devices participating in an application excecuted by an application server can be distributed among a plurality of servers.

Accordingly, the system is provided for identifying proximate devices arranged for detecting a sensory identifier and transmitting request messages comprising representations of the detected sensory identifier, the system comprising:
  at least one correlation server for correlating representations received from the devices so as to match two or more of those devices, and
  at least one application server for carrying out an application involving matching devices,
wherein the at least one correlation server and the at least one application server are distinct servers.

By providing distinct servers, that is a correlation server and one or more distinct application servers, the correlation server and the application server can be dedicated to their respective tasks and can be relatively simple. More importantly, if more than one correlation server and/or more than one application server are used, a single (separate) correlation server can be used together with multiple (separate) application servers, or multiple (separate) correlation servers can be used with a single (separate) application server or with multiple (separate) application servers. Accordingly, the invention provides increased flexibility and efficiency.

The correlation server determines whether the (sensory) identifiers detected by the devices match, in other words, whether the respective representations of a (sensory) identifier (and possibly other data) produced by the devices are correlated. In addition, the correlation server determines the identifications of any matching devices and supplies these identifications to the application server. The application server subsequently uses these identifications for carrying out at least one application, such as a game or a service involving matching devices.

The devices of which the identities have to be determined when the devices are proximate are arranged for detecting a sensory identifier and transmitting request messages comprising representations of the detected sensory identifier. That is, the devices are capable of detecting the sensory identifier, which may for example be a sound or image, produce a representation of the sensory identifier, and send the representation, together with any other data, to the correlation server(s) using a request message which serves to request a match.

It will be understood that the term "identifying", in this context, is meant to include the process of establishing the identity of a (mobile or stationary) device or its user by matching at least one (preferably sensory) identifier detected by the device with at least one (preferably sensory) identifier detected by another device, the representations of matching (sensory) identifiers preferably being identical or at least similar. The acknowledgement messages which are sent to the devices when a match has been made may contain an identification of the other device(s) to allow the matched (and therefore proximate) devices to identify each other.

It will further be understood that the term "sensory identifier", in this context, is meant to include identifiers which can be detected by the (human) senses, such as sounds (audio identifiers), images (visual identifiers), smells (olfactory identifiers), touch (pressure identifiers), temperature (temperature identifiers), movement and/or acceleration (motion identifiers), etc.. In addition to sensory identifiers, other identifiers may be used, such as location identifiers (determined by, for example, GPS or GSM technology).

It is noted that in the present context, (sensory) identifiers are understood to comprise information characterising an event or object, while identifications comprise information characterising a device. Detected sensory identifiers, such as bar codes, are embodied in the devices by their representations, such as numerical strings representing bar codes.

In a first embodiment, the at least one application server is arranged for communicating with the devices through the correlation server. In this embodiment, there is no direct communication between the application server and the client devices.

In a second embodiment, the at least one application server is arranged for communicating with the client devices directly, so not through the correlation server. In this embodiment, the client devices communicate with both the correlation server and the application server.

In a third embodiment, the at least one application server is arranged for communicating directly with both the correlation server and with the client devices. In this embodiment, the communication between the application server and the client devices will take place directly, and the communication between the application server and the correlation server, mainly to receive the identifications of the matching devices, also takes place directly.

According to a further aspect of the present invention, the request messages may additionally comprise event fingerprints which contain data describing an event. An event fingerprint may describe the production of a sound (clapping hands, two mobile devices touching), the production of an image (symbol, bar code, movement), or pressing a button. Event fingerprints, therefore, provide additional information relating to the event, in addition to the (representation of the) sensory identifier.

In particular advantageous embodiments of the present invention, sensory identifiers, and hence request messages, may additionally comprise environmental information, such as temperature, air pressure, scent and/or location, and the correlation server may be arranged for correlating the environmental information. In such embodiments, the devices therefore produce information indicative of their surroundings, typically in addition to a basic sensory identifier such as a bar code or a sound. This additional information may assist the correlation server when matching devices and increases the reliability of those matches.

As stated above, the sensory identifier may comprise a sound, preferably a sound produced by tapping the devices together. This allows a quick and easy identification of devices by tapping them together.

It is preferred that the devices are mobile devices, such as mobile telephone devices, but at least one of the devices may not be mobile.

In a further embodiment, the system according to the present invention comprises at least two correlation servers and further comprises at least one proxy server for routing messages from the devices to at least one correlation server, the at least one proxy server preferably being arranged for routing in dependence of the sensory identifier(s). In such an embodiment, the proxy servers may re-route acknowledgement messages from a correlation server or application server to the client devices.

The present invention also provides a server for use in the system defined above, preferably a correlation server which is devoid of application server functionality.

The devices used in conjunction with the system of the present invention are preferably mobile or portable devices, that is, devices such as mobile telephone devices which can be carried by a user. However, the present invention is not so limited and at least one of the devices may be a non-mobile, that is, fixed device, such as a cash register, which is not designed to be carried by a used but is instead designed to be used in a fixed location.

Applications used in the system of the present invention may involve games, (financial) transactions, data exchanges, music, video, etc..

The present invention also provides a method of identifying proximate devices arranged for detecting a sensory identifier and transmitting request messages comprising representations of the detected sensory identifier, the method comprising the steps of:
  at least one correlation server correlating representations received from the devices so as to match two or more of those devices, and
  at least one application server carrying out an application involving matching devices, wherein the at least one correlation server and the at least one application server are distinct servers.

Advantageously, the step of correlating may take previous matches into account. That is, the correlation server may use its history to facilitate the matching process and to improve the accuracy of the matches.

The devices may be mobile devices, such as mobile telephone devices, while the applications may be games, financial transactions, data exchanges and other transactions involving the mobile devices. The applications are facilitated by suitable software program products that are used by the application server.

The present invention additionally provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

BRIEF DESCRIPTION OF THE DRAWING

The present invention will further be explained below with reference to exemplary embodiments illustrated in the accompanying drawings, in which.

DETAILED DESCRIPTION OF EXEMPLARY EMBODIMENTS

Figure 1:
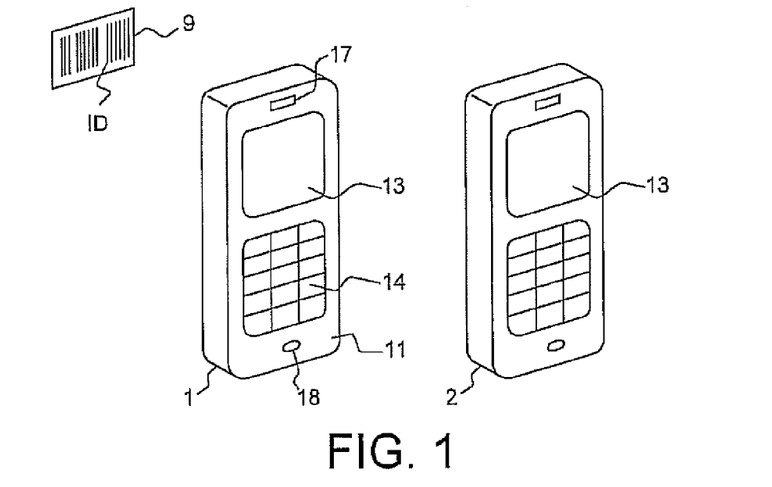
FIG. 1 schematically shows exemplary embodiments of devices and a sensory identifier as may be used in the present invention.

The set of devices shown merely by way of non-limiting example in FIG. 1 comprises a first device 1 and a second device 2, which may be referred to as client devices. In the example shown, the client devices are mobile (that is, portable) telephone devices arranged for mobile (that is, cellular) telephone services which may, however, also incorporate other functions, such as PDA (Personal Digital Assistant) functions.

Figure 2:
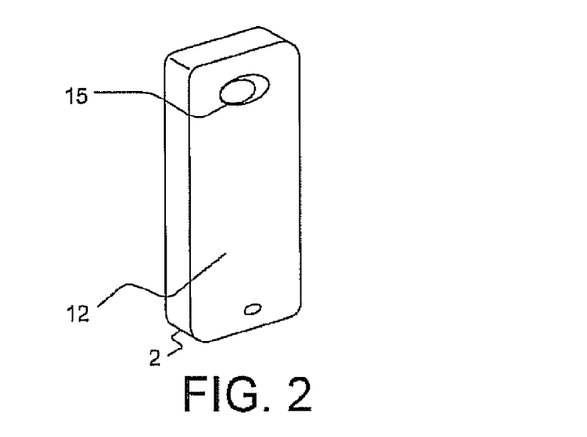
FIG. 2 schematically shows the back of an exemplary embodiment of a device as shown in FIG. 1.

Each mobile device 1, 2 has a front face 11 on which a display screen 13, a keypad 14, a loudspeaker 17 and a microphone 18 are arranged. It will be understood that the loudspeaker and/or the microphone may alternatively be arranged on a side face of the device. As shown in FIG. 2, each mobile device may have a bar code scanner or camera 15 arranged at its rear face 12.

The mobile devices 1, 2 are capable of detecting a sensory identifier. The merely exemplary sensory identifier ID shown in FIG. 1 is constituted by a bar code. This bar code may be "read" by a bar code scanner or a camera of a mobile device, as shown in FIG. 2.

A visual sensory identifier, such as a bar code or a symbol, may be applied on a sticker or label 9. Instead of a stationary spatial pattern, such as the regular bar code shown in FIG. 1, a temporal pattern may be used, such as a blinking pattern or symbol of which the frequency and/or time intervals contain the identifying information. Accordingly, the visual identifier may be constituted by a spatial and/or temporal pattern, for example produced by a display (such as an advertising display in a shop or shop window) or a light.

The sensory identifier may alternatively, or additionally, comprise an audio identifier, such as a sound signal. The audio identifier may be rendered by a loudspeaker of a device, or may be produced by a percussive element external to the device, such as a drum or a tuning fork. Alternatively, or additionally, the audio identifier may be produced by clapping hands or by tapping the (mobile) devices together. The sensory identifier may be accompanied by a time stamp, preferably indicating the "absolute" time ("wall clock time"). This allows sensory identifiers from multiple sources to be distinguished.

As stated above, an audio identifier may be produced by tapping the (mobile) devices 1 and 2 together. The tapping sound is received by the microphones 18 of both mobile devices. The audio identifier may alternatively be constituted by a sound signal produced by a loudspeaker (e.g. a loudspeaker 17 of the mobile devices shown in FIG. 1), the sound signal preferably consisting of multiple tones and/or pulses so as to be able to distinguish a plurality of different identifiers and/or time stamps.

Alternatively, or additionally, scent identifiers and/or touch identifiers may be used. The devices may, in such embodiments, be capable of detecting smells which are also detected by another device, or may be capable of sensing the surface of another object or device, the sensed surface containing touch identifiers, for example Braille symbols. Movement detectors for detecting (common) movements of the (mobile) devices may also be used. The present invention is therefore not limited to audio or visual identifiers.

The sensory identifiers, in the example of FIGS. 1 and 2 visual identifiers, serve to identify the devices when they are located in each other's proximity. The method of identifying serves to determine the identity of the other device, which identity may subsequently be used for exchanging information and/or playing games. More in particular, the method of identifying according to the present invention may comprise several steps, including the steps of a device detecting a sensory identifier (such as a bar code or an audio signal) and sending a request message associated with the sensory identifier to a server common to the devices. It is further possible to verify the detected identifier by comparing (a representation of) the identifier with a predetermined format, range or similar measure. Pattern recognition techniques may be used to match the detected identifier with a stored identifier format and/or to recognize the detected identifier.

Different arrangements of the devices 1 & 2 and any servers are possible. In the following description, the (mobile or non-mobile) devices will be referred to as client devices (server—client model).

Figure 3:
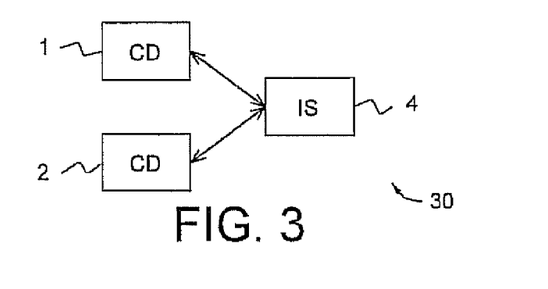
FIG. 3 schematically shows an arrangement of client devices and a combined or integrated server according to the Prior Art.

The Prior Art system 30 shown in FIG. 3 comprises a first client device (CD) 1, a second client device 2 and a single server 4. The server 4 combines the functions of a correlation server and an application server and is therefore referred to as integrated server (IS). Its correlation function correlates information received from the client devices in order to find any matches, while its application function provides applications, such as payment services, game services or other services and activities, in response to matches.

The correlation (server) function is designed to find matches between devices by correlating data received from those devices. The term "correlation" refers to establishing the correspondence between the data concerned, that is, determining whether the received data are related by means of comparison or other methods. Thus it can be determined, for example, whether the received data are related to the same event, such as the detection of a sound or symbol by the client devices. The data received from the devices preferably comprise the representations of identifiers, in particular sensory identifiers. In other words, the correlation function determines whether (sensory) identifiers and any other relevant data received from the client devices, such as event fingerprints, match. Explicit reference is made to International Patent Application WO 2009/014438, in which techniques are disclosed for identifying proximate devices, such as mobile telephone devices, using sensory identifiers.

The application (server) function is arranged for running an application, that is, application software suitable for carrying out a specific game or other function, such as the exchange of telephone numbers or generating a common tune.

In Prior Art systems, as shown in FIG. 3, the correlation function and the application function are combined in a single integrated server (IS) unit, for example by providing two sets of software programs (correlation and application software programs) which are executed by the same server unit. This arrangement works well when only a single server is used, but is inefficient when it is scaled. To support multiple applications, the Prior Art arrangement would use multiple combined servers, each having a correlation function and an application function. It has been found that such an arrangement is not efficient, as it involves duplication of the correlation function, thus unnecessarily claiming server resources. Alternatively, (part of) the application software may be executed by the client devices, which may also lead to an undesired duplication of software and functions and an undesired claiming of client device resources.

Figure 4A:
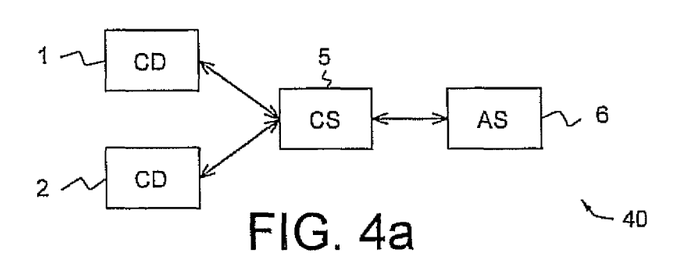
FIG. 4a schematically shows a first arrangement of client devices and distinct servers according to the present invention.

The inventive system 40 shown merely by way of non-limiting example in FIG. 4a also comprises a first client device 1 and a second client device 2. However, instead of a single, integrated server (4 in FIG. 3) the system 40 according to the present invention comprises a correlation server (CS) 5 and an application server (AS) 6, which are constituted by distinct server units. In other words, a dedicated correlation server 5 and a separate, dedicated application server 6 are used, instead of a combined server as in the Prior Art. The use of separate servers makes it very much easier and more effective to scale the system if larger numbers of clients or larger numbers of applications are used.

If the number of clients or the number of correlation events increases significantly while using only a single, or only a limited number of applications, a single application server 6 can be used in conjunction with a plurality of correlation servers 5, without the need to provide multiple copies of the application software on multiple servers. Conversely, when only a limited number of client devices or correlation events is involved but complex and/or many applications are used, a single correlation server 5 can be used in conjunction with a plurality of application servers 6, without the need to provide multiple copies of the correlation software on multiple servers. The system of the present invention therefore offers a greatly improved efficiency compared to the Prior Art system.

It is noted that the distinct server units may be constituted by servers having separate casings, which may be spaced apart and which may even be in different locations.

In the system 40 of FIG. 4a, the application server 6 is shown to communicate with the correlation server 5, which in turn communicates with the client devices 1 and 2. There is no direct communication between the application server 6 and the client devices 1 and 2.

Figure 4B:
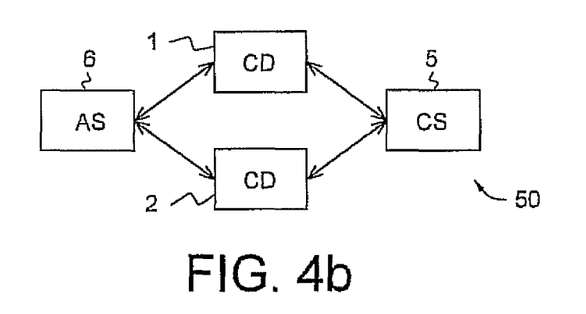
FIG. 4b schematically shows a second arrangement of client devices and distinct servers according to the present invention.

An alternative arrangement is schematically shown in FIG. 4b. In the system 50 according to the present invention, both the correlation server 5 and the application server 6 communicated directly with the client devices. In addition to the communication links shown in FIG. 4b, the correlation server 5 and the application server 6 may also communicate directly, although this is not necessary if the client devices are arranged for forwarding messages to and from both servers.

Figure 5:
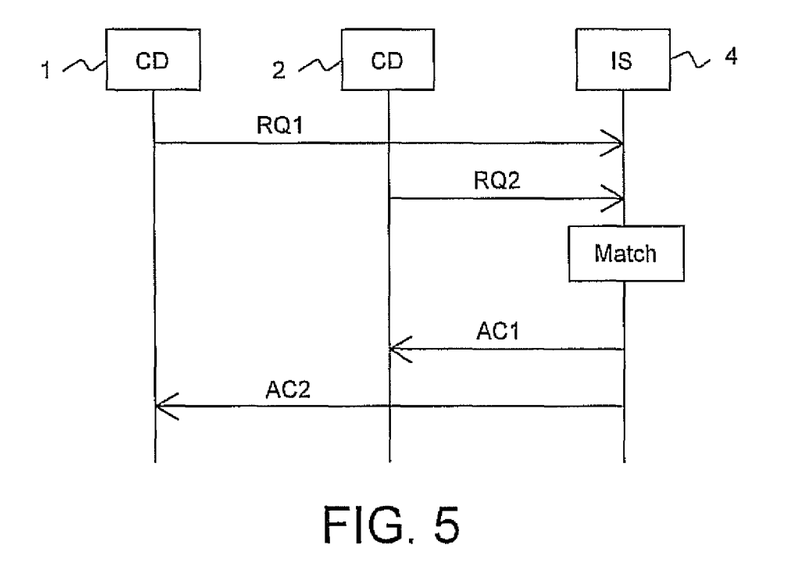
FIG. 5 schematically shows an exchange of messages using only a single, combined server as in the Prior Art.

The diagram of FIG. 5 illustrates the exchange of messages between a first client device 1, a second client device 2 and a combined or integrated server (IS) 4. In this arrangement, where no separate application server is present (see also FIG. 3), the application software is executed by the combined server 4 and/or the client devices 1 & 2.

The client devices may produce request messages RQ1 and RQ2 which constitute match requests. These messages contain a representation of an identifier, and possibly also an identification of the devices. The message RQ1 may thus be written as:

RQ1={CI1, RE1, ... } where RQ1 is the request message produced by client device 1, CI1 is an identification of client device 1 (for example a unique device number or a telephone number), and RE1 is a (digital) representation of an identifier, preferably a sensory identifier.

It is noted that the representation of an identifier may be a string of digits or numbers representing the identifier. A bar code, as illustrated in FIG. 1, can for example be represented by a string of numbers. Similarly, a sound may be represented by its frequencies and time of occurrence, or by other parameters. In general, the representation will be a coded version of an identifier.

The (sensory) identifier can be produced by an event, such as the tapping together of two client devices, or by the detection of a symbol (such as a bar code) by the devices, and may serve as a "fingerprint" of the event: data which uniquely characterise the event. It can thus be seen that the integrated server 4 attempts to match the "fingerprints" of events detected by the client devices.

The server 4 sends a response indicating whether a match has been made, and if this is the case, the response may contain an identification of the matching client device(s). In the example of FIG. 5, a match has been made and the client devices 1 and 2 receive acknowledgement messages AC1 and AC2 respectively, which will preferably include the identification of the other, matching device. Alternatively, "no match" messages can be sent if no match has been made.

Figure 6:
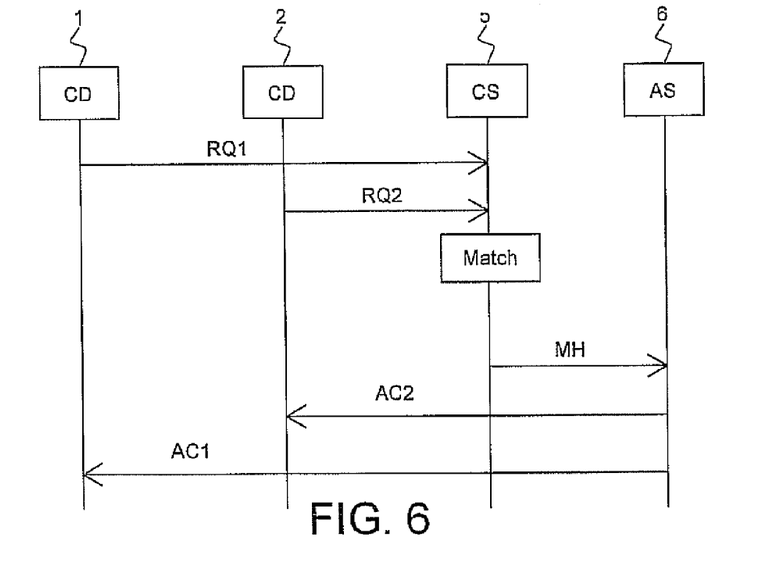
FIG. 6 schematically shows an exchange of messages using two distinct servers according to the present invention.

The diagram of FIG. 6 illustrates the exchange of messages between a first client device 1, a second client device 2, a (dedicated) correlation server 5 and an separate application server 6 in the system (40 in FIG. 4a) of the present invention. The correlation server 5 is preferably devoid of any application functionality, and conversely, the application server 6 is preferably devoid of any correlation functionality, so as to provide distinct servers, each server having its own, separate function.

It can be seen that in the embodiment shown the correlation server 5 sends the match message MH (MatcH) corresponding to a successful match to the application server 6 for processing by the corresponding application, and that the application server 6 then responds to the client devices 1 and 2 by sending respective acknowledgement messages AC1 and AC2. It can thus be seen that in this embodiment, the application server 6 produces the acknowledgement messages. The application server 6 may send these messages to the client devices directly (see FIG. 4*b*) or via the correlation server (see FIG. 4*a*), depending on the particular configuration of the system.

The acknowledgement messages may have the following structure:

$$AC1=\{CI2,\ldots\}, AC2=\{CI1,\ldots\}$$

where CI2 is the identification of client device 2 and CI1 is the identification of client device 1. Accordingly, the acknowledgement messages provide a mutual identification of the matched devices. It is noted that all messages preferably comprise a header, in addition to the information ("payload") they contain.

Those skilled in the art will appreciate that the diagram of FIG. 6 can be easily altered when more than one correlation server 5 and/or more than one application server 6 is used. For example, a single correlation server 5 can be used in conjunction with two or more application servers 6. Alternatively, a single application server 6 can be used in conjunction with two or more correlation servers 5.

In a particularly advantageous embodiment in which the system according to the present invention comprises at least two correlation servers 5, it further comprises at least one proxy server for routing request messages (for example RQ1) from the client devices to at least one of the at least two correlation servers. The at least one proxy server may additionally or alternatively be arranged for routing an acknowledgement message (for example AC1) from a correlation server or an application server to a client device. This use of proxy servers is described in European Patent Application EP09179950 (TNO Ref 2009-007), which is herewith incorporated in this document in its entirety.

In an embodiment the proxy server is configured to select one or more of a collection of correlation servers to which it will forward a request message. Selection may be performed for example based on the value of the sensory identifier and/or on a location from which a device 1,2 has transmitted the request message (represented for example by a base station of a mobile network cell through which the request message is transmitted, or a cell ID of a cell ID of the mobile network that was used to transmit the request message). The proxy server may comprise a table which associates respective ranges of sensory identifier values or network cells, or ranges of combinations thereof each with a respective correlation server. In this case, the proxy determines in which range or ranges the value of the sensory identifier, the location or their combination lies and forwards the request message to the correlation server or servers for that or those ranges as identified in the table. A range may be defined for example based on a time duration between successively detected touches on a device, different ranges of time durations being associated with different correlation servers.

In an embodiment, partially overlapping ranges are used, so that the request messages are forwarded to more than one correlation server if the value of the value of the sensory identifier, the location or their combination lies in an overlap between different ranges. In this way it is avoided that variations near the borders of the ranges leads to failures to detect matching devices. In addition to the value of the sensory identifier and the location or instead of this value or location, the proxy may use the type of sensory identifier (e.g. audio, visual, touch) may be used to select a correlation server. The proxy may comprise message processor coupled to a receiver, a transmitter, and a memory, the memory storing the table. The message processor may comprise a programmable processor and a program of instructions to perform the functions as described.

Figure 7:
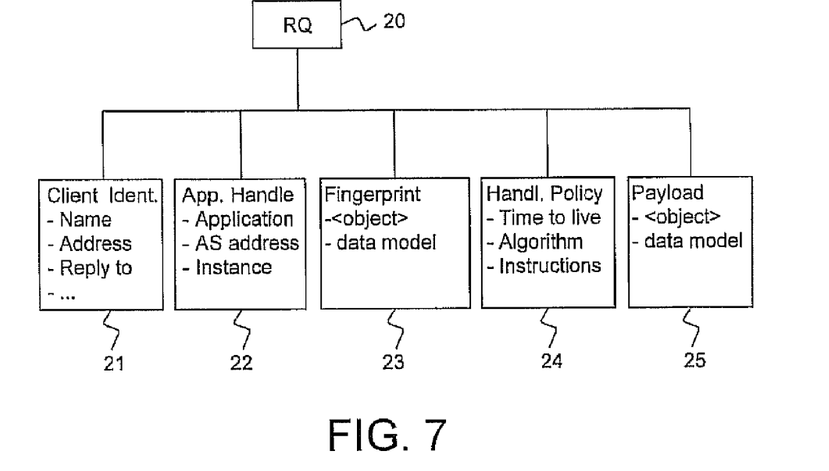
FIG. 7 schematically shows a protocol data model according to the present invention.

The diagram of FIG. 7 illustrates a preferred data model used in the exchange of messages between the client devices, the correlation server(s) and the application server(s), for example according to FIG. 6. In this preferred embodiment, the elements of the protocol between the client devices and the correlation server are data describing an event, such as providing a sensory identifier. The data describing the event are contained in a request message (RQ) 20 and may be constituted by:
  client identity data 21,
  application handle data 22,
  fingerprint data 23 (including sensory identifier representation data),
  handling policy data 24, and/or
  payload data 25.
It is noted that in the model of FIG. 7, the sensory identifier representation data and the event fingerprint data are collectively referred to as fingerprint data 23.

More in particular, the data model comprises:
  Client identification (also referred to above as client identification CI):
    "Name", location-independent identification
    "Address": e.g. IP address plus port number
    "Reply-to": e.g. IP address plus port number
  other identity items.
  Application handle
    Application identifier
      For example "Stratego", "File", "Business card"
    Application server address
      For example URI or IP address of Stratego Server, plus port number
    Instance identification
      For example "Stratego game Barcelona 3"
  Fingerprint vector
    (XML) object on the basis of which the "match is made"
    Fingerprint data model identification
      For example the name of the specific XML scheme for the XML object
  Handling policy
    Time-to-live (expiry of data validity)
    Identification of matching/correlation algorithm
      Any additional parameters/criteria
    Additional handling instructions, e.g. security, privacy, integrity, billing, . . .
  Payload
    (XML) object that is exchanged in case of a positive match.
    Payload data model identification
      For example a field "plain text".
Additionally, "Null" behaviour may be used if the fields in the data model are not filled in:
  "Null" application server address: match is not forwarded to separate application server, but in case of a match payload A goes directly to client B and vice versa.
  "Null" fingerprint: match only on the basis of application handle and handling policies.
  "Null" time-to-live: default value, e.g. 2 seconds.
  Etcetera.

Figure 8:
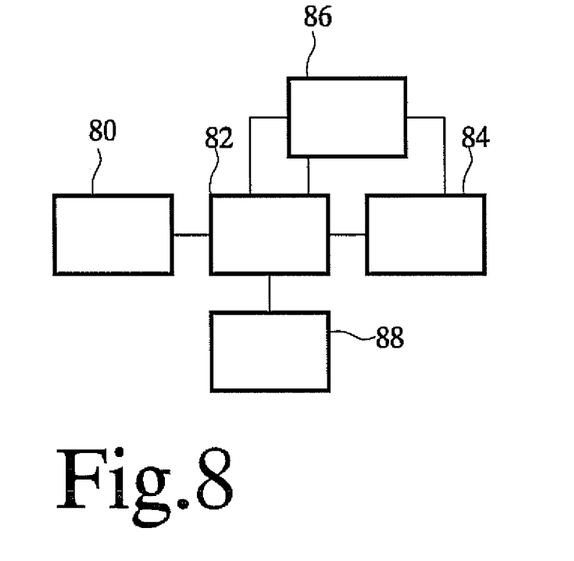
FIG. 8 shows a correlation server

FIG. 8 shows an embodiment of the correlation server, comprising a receiver 80, a message processor 82, a memory 84, a match detector 86 and a transmitter 88. Message processor 82 has an input coupled to receiver 80, interfaces to memory 84 and match detector 86 and an output coupled to transmitter 88.

In operation, receiver 80 receives request messages. Receiver 80 may be an Internet message receiver for example, which is configured to "listen" to a predetermined port and the handle messages received at that port as request messages. Receiver 80 passes data derived from the request messages to message processor 82. Similarly, transmitter 88 transmits match messages. Transmitter 88 may be an Internet message transmitter for example, which is configured to transmitted match messages at a predetermined port.

Message processor 82 is configured to perform a number of actions: it stores data derived from request messages in memory 84, it commands match detector 86 to compare data derived from request messages, it signals transmitter 88 to transmit match messages and it discards selected data from memory 84. As used herein, "configured to" is used to indicate that message processor 82 comprises a programmable processor and a program of instructions for that processor to perform the described functions, or that message processor comprises dedicated hardware to perform part or all of these functions. Part or all of the functions of receiver 80, match detector 86 and transmitter 88 may also be implemented using programs of instructions for the processor.

When message processor 82 receives data derived from a new request message (for the sake of brevity, this will be called receives the request message), message processor 82 commands message detector 86 to compare data from the new request message to data from stored request messages in memory 84. When message detector 86 detects a match, it reports this to message processor 82. If a match is reported, message processor 82 causes transmitter 88 to transmit a message based on the match and message processor 82 removes the stored request message from memory 84 with which the reported match was found from memory 84. If no match with a stored request message is reported in response to the command, message processor 82 stores the new request message in memory 84, optionally in combination with information indicating the time of storage. In a separate process, message processor 82 periodically cleans up memory 84 by removing request messages that have been stored more than a predetermined time period before, or which carries other timing information (such the time of entry of the request message in the network or time of detection of the sensory identifier) indicating a time before a sliding threshold time.

In an embodiment message detector 86 compares at least the sensory identifiers of the request messages and the applications indicated by the request messages, and it indicates a match only if both match.

In an embodiment message processor 82 causes transmitter 88 to transmit a match message based on the match to an application server identified by the matching indications of the application in the matched request messages. When a plurality of different applications is possible, this serves to ensure that one application is selected by the correlation server according to the messages.

In an embodiment message processor 82 causes transmitter 88 to transmit acknowledge messages back to the client devices 1, 2 when message detector 86 reports detection of a match. Message processor 82 may be configured to include cross-wise identifications in the acknowledge messages to the client devices 1,2, identifying the first matching client device to the second matching client device and vice versa, so that the matched client devices will be able to identify each other. In another embodiment message processor 82 is configured to generate respective different session identifiers in response to respective detected matches and to transmit each session identifier back to the client devices involved in the match, without directly identifying the devices to each other. Message processor 82 may be configured to generate a further message specifying the session identifier and identifiers of the matched devices to the application server. In this case the devices may use the session identifier in messages to the application server. Thus, a form of privacy protection is realized, wherein the client devices remain anonymous to each other.

It is noted that the correlation procedure used in the present invention may have alternative embodiments. In a first embodiment, the correlation procedure is stateless: it does not take its history into account. This embodiment has the advantage of simplicity. In a second embodiment, the correlation procedure is stateful: it takes its history into account.

The present invention is based upon the insight that it is more efficient to use separate servers for the (event) correlation function and the application function, as this offers a significantly improved scalability.

It is further noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A system for identifying a combination of proximate devices that are each arranged for detecting a sensory identifier and transmitting a request message comprising a representation of the detected sensory identifier, the system comprising:
    a plurality of application servers for performing mutually different applications involving communication with the matching devices, the devices that transmit the request messages each indicating at least one of said applications,
    at least one correlation server distinct from the application server for correlating representations received in the request messages transmitted by the devices so as to match two or more of those devices by determining whether the sensory identifier detected by the devices is the same, the at least one correlation server being configured to determine whether the devices that transmitted the request messages with correlated representations received from the devices indicate a same one of the applications and to match the devices if this is the case, and
    wherein the correlation server is configured to transmit a match message to a selected one of the application servers in response to detection that the request messages received from the devices contain the correlated representations and that the devices that transmitted indicate a same one of the applications, the selected one of the application servers being selected according to whether the selected one of the application servers performs said same one of the applications.

2. The system according to claim 1, wherein the at least one application server is arranged for communicating with the devices through the correlation server.

3. The system according to claim 1, comprising a plurality of application servers for performing mutually different applications, the request messages each indicating at least one of said applications, the at least one correlation server being configured to determine whether the request messages with correlated representations received from the devices indicate a same one of the applications and to match the devices only if this is the case.

4. The system according to claim 3, wherein the correlation server is configured to transmit a match message to a selected one of the application servers in response to detection that the request messages received from the devices contain correlated representations and indicate a same one of the applications, a selected one of the application servers being selected according to whether it performs said same one of the applications.

5. The system according to claim 1, wherein the at least one application server is arranged for communicating with the devices directly, at least after receiving a match message indicating the devices based on detection of said correlation from the correlation server.

6. The system according to claim 1, wherein the request messages further comprise environmental information, such as temperature, air pressure, scent and/or location, and wherein the correlation server is arranged for additionally correlating the environmental information.

7. The system according to claim 1, wherein the sensory identifier comprises a sound, preferably a sound produced by tapping the devices together, and/or an image, preferably a symbol.

8. The system according to claim 1, wherein the devices are mobile devices, preferably mobile telephone devices.

9. The system according to claim 1, comprising at least two correlation servers, further comprising at least one proxy server for routing request messages from the devices to a correlation server, the at least one proxy server preferably being arranged for routing in dependence of the sensory identifier.

10. The system according to claim 9, wherein the at least one proxy server is configured to associate each correlation server with a predetermined range of values of the sensory identifier, a base station through which the request message is transmitted, a type of the sensory identifier and/or a combination of part or all of these properties, and to route each respective request messages from the devices to a selected one or a selected plurality of correlation servers, associated with the range or ranges in which a value of the sensory identifier, the source cell through which the respective request message is transmitted, a type of the sensory identifier and/or a combination of part or all of these properties lies.

11. The system according to claim 9, wherein the at least one proxy server is arranged for routing an acknowledgement message from a correlation server to a device.

12. The system according to claim 1, wherein the request messages each comprise at least one of:
   a client identity indicating a client device,
   an application handle indicating an application program to be executed,
   a fingerprint vector indicating event data,
   a handling policy indicating a correlation algorithm and/or handling instructions, and
   a payload containing data to be exchanged.

13. A correlation server for use in the system according to claim 1, comprising a receiver for receiving request messages comprising first representations and a request message comprising a second representation from respective devices,
a transmitter,
a memory and
a message processor coupled to the receiver, the message processor being configured to store data derived from the request messages received by the receiver in the memory
a match detector configured to perform a comparison of the first representations of a sensory identifier in the stored data of the received request messages with the second representation of a sensory identifier from a subsequently received request message to detect a match indicating that one of the first representations and the second representation represent a same sensory identifier, to determine whether the devices that transmitted said one of the first representations and the second representation indicate a same one of the applications and to match the devices only if this is the case, wherein the message processor is configured to cause the match detector to perform said comparison, to select an application server from a plurality of application servers for performing mutually different applications, according to whether the selected application server performs said same one of the applications, and to cause the transmitter to transmit a match message to the selected application server, in response to detection of said match indicating that said one of the first representations and the second representation represent the same sensory identifier, the match message identifying the devices that transmitted said one of the first representations and the second representation, or a session identifier associated with these devices, the devices being distinct from the application server.

14. A method of identifying a combination of proximate devices that are each arranged for detecting a sensory identifier and transmitting a request message comprising a representation of the detected sensory identifier, the method comprising the steps of:
   at least one correlation server correlating representations received in the request messages transmitted by the devices so as to match two or more of those devices by determining whether the sensory identifier detected by the devices is the same, to determine whether the devices that transmitted the request messages with correlated representations received from the devices indicate a same one of the applications, and to match the devices if this is the case,
   selecting one of a plurality of application servers for performing mutually different applications, according to whether the selected one of the application servers performs said same one of the applications and
   the selected at least one application server carrying out an application involving communication with the matching devices,
   wherein the at least one correlation server and the at least one application server are distinct servers.

15. The method according to claim 14, wherein the request messages further comprise environmental information from the devices, such as temperature, air pressure, scent and/or location, and wherein the method comprises the further step of the correlation server correlating the environmental information in addition to the representations.

16. The method according to claim 14, wherein the step of correlating takes previous matches into account.

17. The method according to claim 14, wherein the sensory identifier comprises a sound, preferably a sound produced by tapping the devices together, and/or an image, preferably a symbol.

18. A computer program product comprising a non-transitory computer readable medium having a computer program embodied thereon, the computer program including instructions for a programmable processor that, when executed by the programmable processor, will cause the programmable processor to perform the method according to claim 14.

* * * * *